(12) United States Patent
Ren et al.

(10) Patent No.: US 12,581,487 B2
(45) Date of Patent: Mar. 17, 2026

(54) SEARCH SPACE SET FOR MONITORING PHYSICAL DOWNLINK CONTROL CHANNEL (PDCCH) OF ONE CELL IN MULTIPLE CELLS

(71) Applicants: QUALCOMM Incorporated, San Diego, CA (US); Yuwei Ren, Beijing (CN); Huilin Xu, Temecula, CA (US); Seyedkianoush Hosseini, San Diego, CA (US); Wanshi Chen, San Diego, CA (US)

(72) Inventors: Yuwei Ren, Beijing (CN); Huilin Xu, Temecula, CA (US); Seyedkianoush Hosseini, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 17/758,674

(22) PCT Filed: Jan. 20, 2020

(86) PCT No.: PCT/CN2020/073131
§ 371 (c)(1),
(2) Date: Jul. 12, 2022

(87) PCT Pub. No.: WO2021/146830
PCT Pub. Date: Jul. 29, 2021

(65) Prior Publication Data
US 2023/0124056 A1     Apr. 20, 2023

(51) Int. Cl.
*H04W 72/1273*     (2023.01)
*H04W 72/232*     (2023.01)

(52) U.S. Cl.
CPC ..... *H04W 72/1273* (2013.01); *H04W 72/232* (2023.01)

(58) Field of Classification Search
CPC ............ H04W 72/1273; H04W 72/232; H04L 5/0098; H04L 5/0053; H04L 5/001
See application file for complete search history.

(56) References Cited

U.S. PATENT DOCUMENTS

| | | | | |
|---|---|---|---|---|
| 11,864,186 B2 * | 1/2024 | Zhou | | H04L 5/001 |
| 2019/0149380 A1 * | 5/2019 | Babaei | | H04W 72/23 |
| | | | | 370/330 |

(Continued)

FOREIGN PATENT DOCUMENTS

| | | |
|---|---|---|
| CN | 109644487 A | 4/2019 |
| CN | 110475356 A | 11/2019 |

(Continued)

OTHER PUBLICATIONS

Zhou et al. U.S. Appl. No. 62/882,707, filed Aug. 5, 2019 (Year: 2019).*
Yi et al. U.S. Appl. No. 62/825,293, filed Mar. 28, 2019 (Year: 2019).*
Supplementary European Search Report—EP20915117—Search Authority—The Hague—Sep. 20, 2023.

(Continued)

*Primary Examiner* — Wutchung Chu
(74) *Attorney, Agent, or Firm* — Norton Rose Fulbright US LLP

(57)     ABSTRACT

The present disclosure relates to a search space set for monitoring physical downlink control channel (PDCCH) of one cell in multiple cells. For example, a method of wireless communication includes receiving, by a user equipment (UE), one or more search space sets for a second cell. The method also includes performing, by the UE based on the one or more search space sets, first physical downlink control channel (PDCCH) monitoring for the second cell and second PDCCH monitoring for the second cell in the second cell. Other aspects and features are also claimed and described.

33 Claims, 9 Drawing Sheets

*800*

Receive, by a user equipment (UE), one or more search space sets for a second cell — 801

Perform, by the UE based on the one or more search space sets, first physical downlink control channel (PDCCH) monitoring for the second cell in a first cell and second PDCCH monitoring for the second cell in the second cell — 802

(56) References Cited

U.S. PATENT DOCUMENTS

| | | | | |
|---|---|---|---|---|
| 2019/0313390 A1 | 10/2019 | Cheng | | |
| 2020/0120584 A1* | 4/2020 | Yi | H04L 5/0048 |
| 2020/0204318 A1* | 6/2020 | Thangarasa | H04W 74/0833 |
| 2020/0313833 A1* | 10/2020 | Yi | H04L 5/001 |
| 2020/0314747 A1* | 10/2020 | Zhou | H04W 76/15 |
| 2020/0337029 A1* | 10/2020 | Yi | H04W 72/23 |
| 2020/0351777 A1* | 11/2020 | Kim | H04W 52/0245 |
| 2021/0006376 A1* | 1/2021 | Cirik | H04L 5/0094 |
| 2021/0029726 A1* | 1/2021 | Papasakellariou | H04L 5/0053 |
| 2021/0045147 A1* | 2/2021 | Zhou | H04W 72/23 |
| 2021/0067268 A1* | 3/2021 | Seo | H04L 1/0052 |
| 2021/0112585 A1* | 4/2021 | Ji | H04W 72/23 |
| 2021/0360666 A1* | 11/2021 | Yoshimura | H04L 1/1896 |
| 2021/0385826 A1* | 12/2021 | Moon | H04L 1/0046 |
| 2021/0392627 A1* | 12/2021 | Kim | H04W 72/11 |
| 2022/0007399 A1* | 1/2022 | Rastegardoost | H04L 1/1861 |
| 2022/0201716 A1* | 6/2022 | Yi | H04W 24/08 |
| 2022/0232537 A1* | 7/2022 | Seo | H04L 5/0053 |
| 2022/0394747 A1* | 12/2022 | Takeda | H04L 5/0053 |
| 2023/0131118 A1* | 4/2023 | Kim | H04W 52/0216 370/311 |
| 2024/0137938 A1* | 4/2024 | Zhou | H04L 5/001 |

FOREIGN PATENT DOCUMENTS

| | | | | |
|---|---|---|---|---|
| WO | WO-2016116019 A1 | 7/2016 | | |
| WO | WO-2020001225 A1 | 1/2020 | | |
| WO | WO-2021207416 A1 * | 10/2021 | H04L 5/001 |
| WO | WO-2023249427 A1 * | 12/2023 | H04L 5/0098 |

OTHER PUBLICATIONS

Ericsson (Moderator): "Summary of Rel-17 Email Discussion on NR Dynamic Spectrum Sharing", RP-192677, 3GPP TSG-RAN Meeting #86, Dec. 12, 2019 (Dec. 12, 2019), 4 pages, section 2.3.

Ericsson: "Dynamic Spectrum Sharing in Rel-17", 3GPP Draft, RP-191052, 3GPP TSG RAN Meeting #84, Dynamic Spectrum Sharing in REL-17, 3rd Generation Partnership Project (3GPP), Mobile Competence Centre; 650, Route Des Lucioles; F-06921, Sophia-Antipolis Cedex; France, vol. TSG RAN, No. Newport Beach, CA, USA; Jun. 3, 2019-Jun. 6, 2019, Jun. 2, 2019 (Jun. 2, 2019), XP051747266, 6 pages, Retrieved from the Internet: URL: http://www.3gpp.org/ftp/Meetings%5F3GPP%5FSYNC/RAN/Docs/ RP%2D191052%2Ezip [retrieved on Jun. 2, 2019] slides 3,4.

HUAWEI., et al., "Remaining Details for Cross-Carrier Scheduling with Different Numerologies", R1-1906017, 3GPP TSG RAN WG1 Meeting #97 May 17, 2019(May 17, 2019), 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051727474, 8 Pages, http://www.3gpp.org/ftp/ Meetings%5F3GPP%5FSYNC/RAN1/Docs/R1%2D1906017% 2Ezip [retrieved on May 13, 2019], paragraph [0002], Whole document.

International Search Report and Written Opinion—PCT/CN2020/ 073131—ISA/EPO—Oct. 21, 2020.

Nokia: "Draft TP Towards Stage 2 CR on MR DC-CA Enhancements", R1-1907063, 3GPP TSG RAN WG1 Meeting #97, May 17, 2019 (May 17, 2019), 5 pages, the whole document.

Samsung: "Cross-carrier Scheduling with Different Numerologies," 3GPP TSG RAN WG1 #96bis, R1- 1904399, Apr. 8-12, 2019, (Apr. 12, 2019) the whole document, 5 pages.

\* cited by examiner

800

801

Receive, by a user equipment (UE), one or more search space sets for a second cell

802

Perform, by the UE based on the one or more search space sets, first physical downlink control channel (PDCCH) monitoring for the second cell in a first cell and second PDCCH monitoring for the second cell in the second cell

SEARCH SPACE SET FOR MONITORING PHYSICAL DOWNLINK CONTROL CHANNEL (PDCCH) OF ONE CELL IN MULTIPLE CELLS

CROSS-REFERENCE TO RELATED APPLICATIONS

This application claims the benefit of International Patent Application No. PCT/CN2020/073131, entitled, "SEARCH SPACE SET FOR MONITORING PHYSICAL DOWN-LINK CONTROL CHANNEL (PDCCH) OF ONE CELL IN MULTIPLE CELLS," filed on Jan. 20, 2020, which is expressly incorporated by reference herein in its entirety.

TECHNICAL FIELD

Aspects of the present disclosure relate generally to wireless communication systems, and more particularly, but without limitation, to a search space set for monitoring physical downlink control channel (PDCCH) of one cell in multiple cells.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE ray communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmission of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY

The following summarizes some aspects of the prevent disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, according to some aspects, a method of wireless communication includes for receiving, by a user equipment (UE), one or more search space sets for a second cell. The method also includes performing, by the UE based on the one or more search space sets, first physical downlink control channel (PDCCH) monitoring for the second cell in a first cell and second PDCCH monitoring for the second cell in the second cell.

In an additional aspect of the disclosure, an apparatus configured for wireless communication includes means for receiving, by a user equipment (UE), one or more search space sets for a second cell. The apparatus also includes means for performing, by the UE based on the one or more search space sets, first physical downlink control channel (PDCCH) monitoring for the second cell in a first cell and second PDCCH monitoring for the second cell in the second cell.

In an additional aspect of the disclosure, a non-transitory computer-readable medium having program code recorded thereon. The program code further includes code to receive, by a user equipment (UE), one or more search space sets for a second cell, and perform, by the UE based on the one or more search space sets, first physical downlink control channel (PDCCH) monitoring for the second cell in a first cell and second PDCCH monitoring for the second cell in the second cell.

In an additional aspect of the disclosure, an apparatus configured for wireless communication is disclosed. The apparatus includes at least one processor, and a memory coupled to the processor. The processor is configured to receive, by a user equipment (UE), one or more search space sets for a second cell, and perform, by the UE based on the one or more search space sets, first physical downlink control channel (PDCCH) monitoring for the second cell in a first cell and second PDCCH monitoring for the second cell in the second cell.

In an additional aspect of the disclosure, an apparatus configured for wireless communication is disclosed. The apparatus includes an interface configured for wireless communication and a processor system coupled to the interface. The processor system is configured to receive, by a user equipment (UE), one or more search space sets for a second cell, and perform, by the UE based on the one or more search space sets, first physical downlink control channel (PDCCH) monitoring for the second cell in a first cell and second PDCCH monitoring for the second cell in the second cell.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of tire nature and advantages of the prevent disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Figure 1:
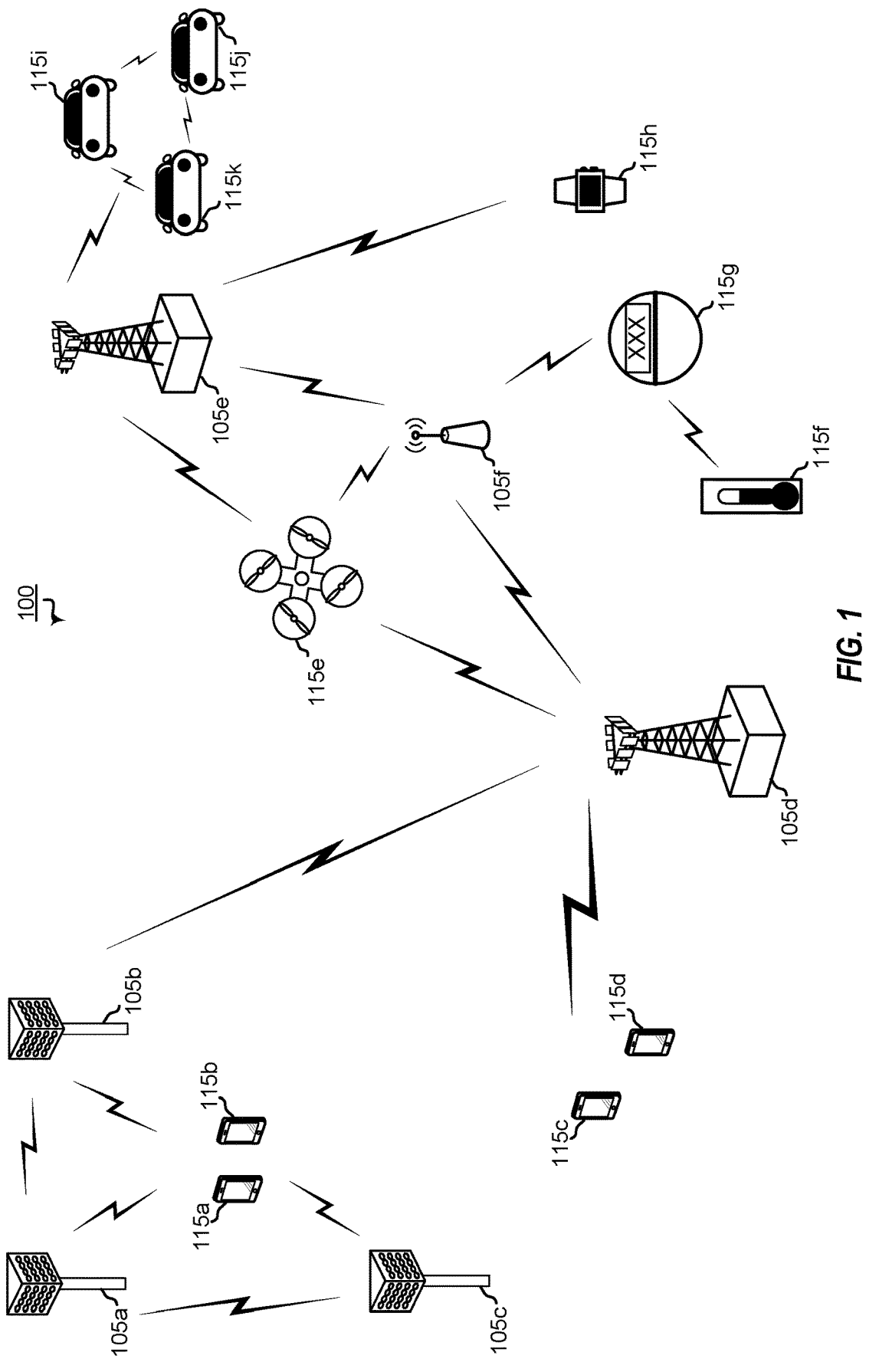
FIG. 1 is a block diagram illustrating details of a wireless communication system according to some embodiments of the present disclosure.

The Appendix provider further details regarding various embodiments of this disclosure and the subject matter therein forms a part of the specification of this application.

DETAILED DESCRIPTION

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wide-band-CDMA (W-CDMA) and low chip rate (LCR), CDMA2000 covers IS-2000, IS-95, and IS-856 standards.

A TDMA network may, for example implement a radio technology such as GSM, 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, live 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km²), ultra-low complexity (e.g., ~10 s of bits/sec), ultra-low energy (e.g.. ~10+ years of battery life), and deep coverage with the capability to reach challenging locations; (2) including mission-critical control with strong security to safeguard sensitive personal financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/ km²), extreme data rates (e.g., multi-Gbps rate, 100+ Mbps user experienced rates), and deep awareness with advanced discovery and optimizations.

5G NR devices, networks, and systems may be implemented to use optimized OFDM based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz. for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The sealable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR. Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range, from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/ small devices, chip-level components, multi-component systems (e.g. RF-chain, communication interface, processor), distributed arrangements, end-user devices, etc. of varying sizes, shapes, and constitution.

FIG. 1 shews wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA) A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the embodiment illustrated in FIG. 1 are examples of mobile smart phone-type devices accessing wireless network 100. A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105*a*-105*c* serve UEs 115*a* and 115*b* using 3D beam forming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 113*d*. Such multicast services may include mobile television or stream video, or may include other services for providing community information, such as weather emergencies or alerts, such us Amber alerts or gray alerts.

Wireless network 100 of embodiments supports mission critical communications with ultra-reliable and redundant links for mission critical devices, such UE 115*e*, which is a drone. Redundant communication links with UE 115*e* include front macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD/FDD communications, such as in a vehicle-to-vehicle (V2V) mesh network between UEs 115*i*-115*k* communicating with macro base station 105*e*.

Typically, PDCCH for a serving cell is monitored in the cell itself or in another cell based on cross-carrier scheduling. For example, each cell may schedule data based on PDCCH received in itself and all the other PDCCH configured to the cell are monitored in the cell itself. As another example, PDCCH with DCI 0-1/1-1 or second cell data is received in the scheduling cell (a first cell)

In some situations, it could be beneficial to allow PDCCH of a serving cell to be monitored in multiple (e.g., ≥2) cells. To illustrate, some PDCCHs for a second cell are received in another cell (a first cell) and the other PDCCHs for the second cell are received in itself (i.e., the second cell). For example, SCell data is cross-carrier scheduled by non-fallback DCIs (0-1, 1-1) in another cell, and SCell data can also be self-scheduled by fallback DCIs (0-0, 1-0). As another example, PCell data is cross-carrier scheduled by non-fullback DCIs (0-1, 1-1). As another cell, and other (or all other) DCIs including group common DCIs and DCIs for broadcast data scheduling are still received in the PCell.

As described further herein, PDCCH for one cell is advantageously monitored in itself and in another cell. Monitoring PDCCH for one cell in multiple cells may allow a more flexible control resource utilization for carrier aggregation. For example, PDCCH monitoring in another cell can offload control signaling in the serving cell. Additionally, or alternatively, when PDCCH for a serving cell is monitored in another cell, it can be extended to DCIs other than non-fallback DCIs for cross-carrier scheduling.

Figure 2:
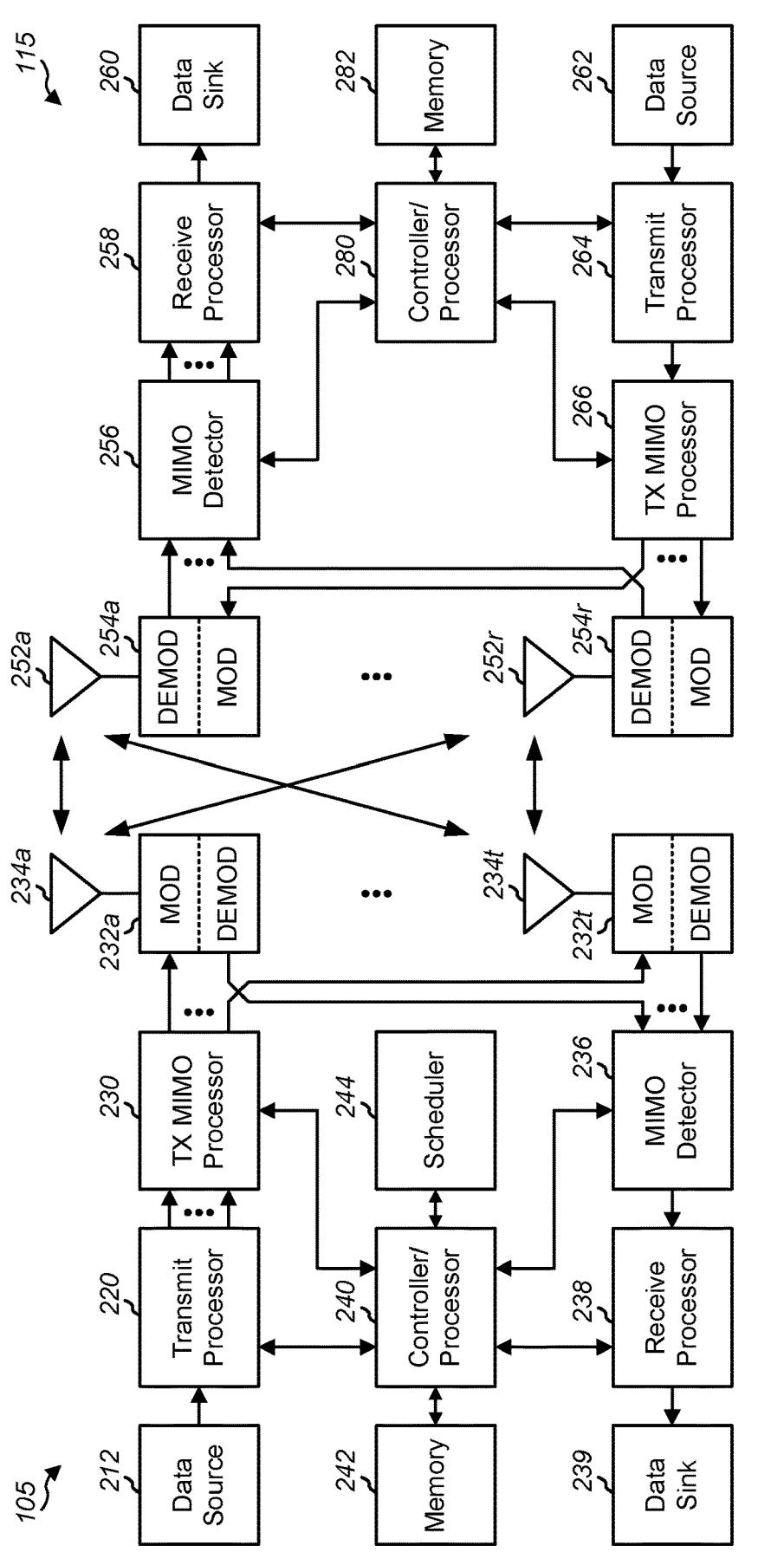
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH) etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, fitter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols, MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols front the transmit processor 264 may be precoded by TX MIMO processor 266 if applicable, further processed by the modulators 254a through 254r (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIG. 8, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band. UEs 115 or base stations 105 may traditionally perform a medium sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window bused on the amount of energy detected on a channel and/or the acknowledge/negative-acknowledge (ACK/NACK) feedback for its own transmitted packets as a proxy for collisions.

Figure 3:
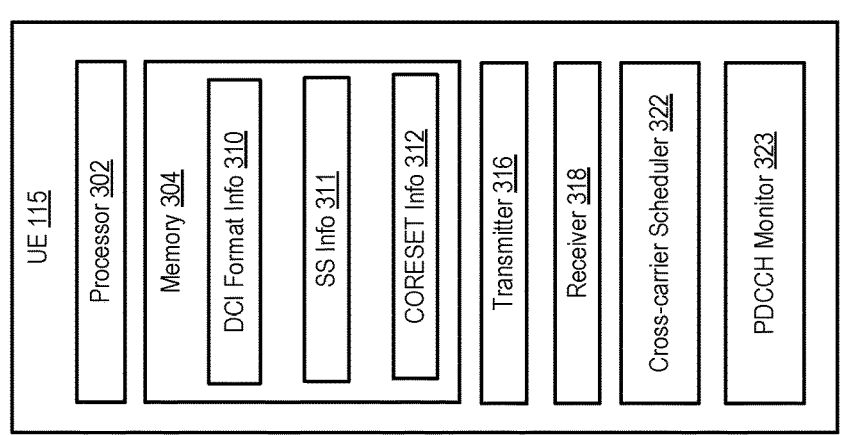
FIG. 3 is a block diagram illustrating a wireless communication system with communications that utilize a search space set for monitoring physical downlink control channel (PDCCH) of one cell in multiple cells in accordance with some aspects of the present disclosure.
Figure 3:
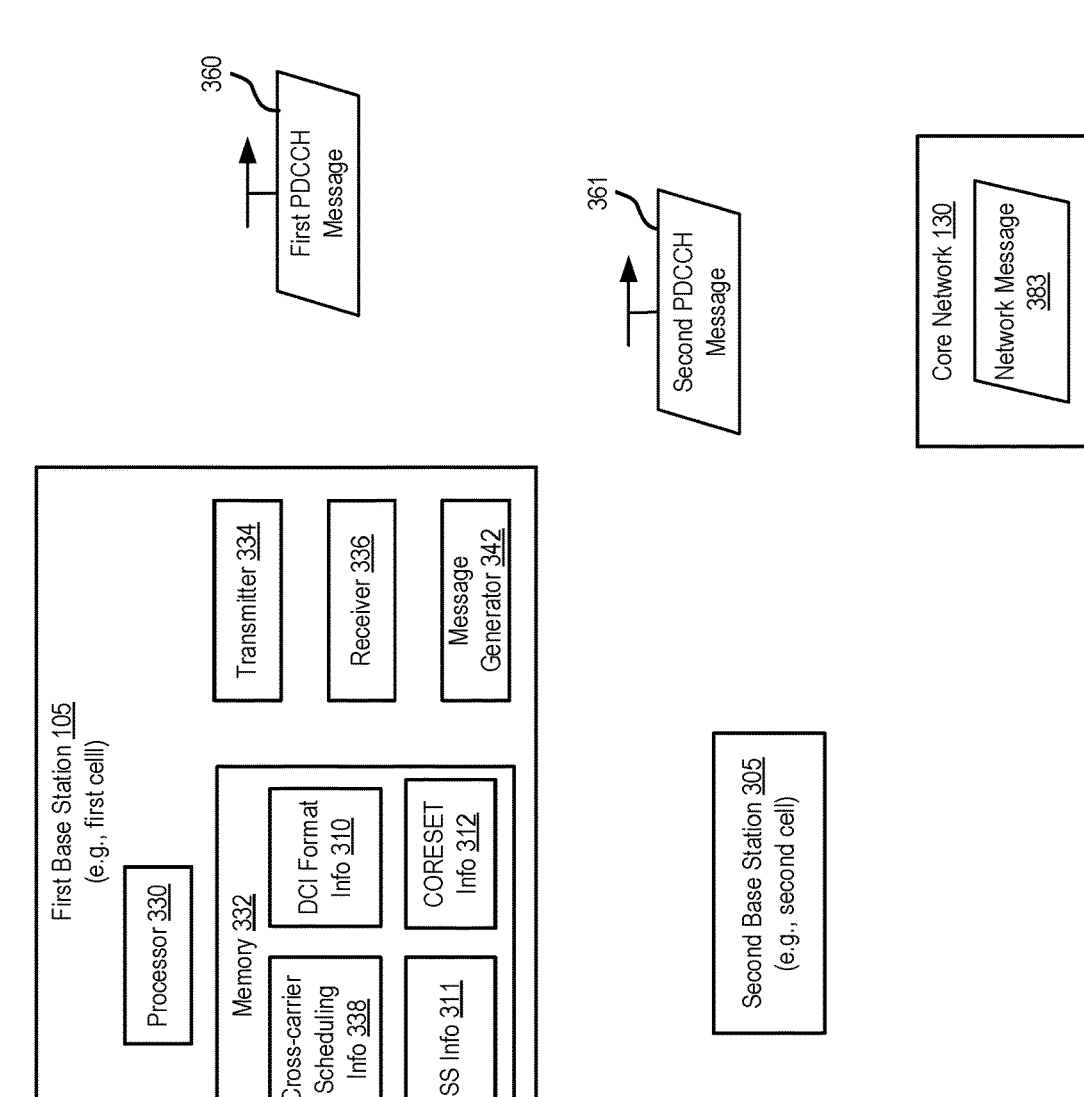

FIG. 3 is a block diagram of an example wireless communications system 300 to utilize physical downlink control channel (PDCCH) monitoring. In some examples, wireless communications system 300 may implement aspects of wireless communication system 100. For example, wireless communications system 300 may include UE 115, one or more base stations, such as a first base station 105 and a second base nation 305, and a core network 130. Although one UE and two base station are illustrated, in other implementations, wireless communications system 300 may include multiple UEs 115, a single base station 105 or more than two base stations 105, or both.

UE 115 can include a variety of components (e.g., structural, hardware components) used for carrying out one or more functions described herein. For example, these components can include a processor 302, a memory 304, a transmitter 316, a receiver 318, a cross-carrier scheduler 322, and a PDCCH monitor 323. Processor 302 may be configured to execute instructions stored at memory 304 to perform the operations described herein. In some implementations, processor 302 includes or corresponds to controller/processor 280, and memory 304 includes or corresponds to memory 282. In addition to the instructions stored at memory 304, memory 304 may be configured to store DCI format information 310, SS information 311, and control resource sets (CORESETs) information 312.

The DCI format information 310 may include or identify one or more DCI formats. For example, the one or more DCI formats may include:

DCI 0_0 and DCI 1_0 for fallback DCIs;
DCI 0_1 and DCI 1_1 for non-fallback DCIs;
DCI 2_0 for notifying the slot format;

DCI 2_1 for notifying the Physical Resource Block(s) (PRB(s)) and
Orthogonal Frequency Division Multiplexing (OFDM) symbol(s) where UE may attune no transmission is intended for the UE;
DCI 2_2 for the transmission of TPC commands for PUCCH and PUSCH; and
DCI 2_3 for the transmission of a group of TPC commands for SRS transmissions.

The SS information 311 may include or indicate a SS set index or a SS type, such as CSS or USS. CORESET information 312 may include a set of time/frequency resources where PDCCH can be transmitted. A CORESET may be semi-statically configured by the network and there may be multiple CORESETs in a carrier and can occur anywhere in the slot and in the frequency range of the carrier. In implementations, an individual CORESET has a max length, such as a max length of 3 OFDM symbols. PDCCH may be transmitted in a CORESET and the CORESET represents signal locations where a given device may receive PDCCH. The basic unite for a CORESET is resource-element groups. A CORESET may be associated with the SS set if CORESET ID (ControlResourceSetId) is included in the SS set configuration (SearchSpace). DCI format information 310, SS information 311, and/or CORESET information 312 may be determined or set based on a standard, or may be set or determined by a network (e.g., 130). When set or determined by the network, UE 115 may receive such information via a network message 383.

Transmitter 516 is configured to transmit data to one or more other devices, and receiver 318 is configured to receive data from one or more other devices. For example, transmitter 316 may transmit data, and receiver 318 may receive data, via a wireless network. In some implementations, transmitter 316 and receiver 318 may be replaced with a transceiver. Additionally, or alternatively, transmitter 316, receiver 318, or both may include or correspond to one or more components of UE 115 described with reference to FIG. 2.

Cross-carrier scheduler 322 is configured to perform and/or coordinate cross-carrier scheduling operations. PDCCH monitor 323 is configured to perform PDCCH monitoring for/of one or more cells (e.g., one or more base stations).

First base station 105 includes a processor 330, a memory 332, a transmitter 334, a receiver 336, and a message generator 342. Processor 330 may be configured to execute instructions stored at memory 332 to perform the operations described herein. In some implementations, processor 330 includes or corresponds to controller/processor 240, and memory 332 includes or corresponds to memory 242. Memory 3332 may include cross-carrier scheduling information 338, DCI format information 310, SS information 311, and CORESET information 312. Cross-carrier scheduling information 338 may be configured to enable cross carrier scheduling operations associated with one or more base stations (e.g., 105, 305). Message generator 342 is configured to generate one or more PDCCH messages.

Transmitter 334 is configured to transmit data to one or more other devices, and receiver 336 is configured to receive data from one or more other devices. For example, transmitter 334 may transmit data, and receiver 336 may receive data, via a wireless network. In some implementations, transmitter 334 and receiver 336 may be replaced with a transceiver. Additionally, or alternatively, transmitter 334, receiver 336, or both may include or correspond to one or more components of base station 105 described with reference to FIG. 2.

Second base station 305 may include or correspond to first base station 105 such that second base station includes one or more components described with reference to first base station 105.

Base stations 105, 305 may communicate with the core network 130 and with one another. For example, base stations 105 may interface with the core network 130 through backhaul links (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 150 may be an evolved packet core (EPC), which may include at least one mobility management entity (MME), at least one serving gateway (S-GW), and at least one packet data network (PDN) gateway (P-GW). The MME may manage non-access stratum (e.g., control plane; functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

To facilitate cross-carrier scheduling, network (e.g., 130) may configure a search space set in the active Bandwidth Part (BWP) (also referred to as a Carrier Bandwidth Part) of the scheduled cell that has the same search space identifier (ID) as that of a search space set in the active BWP of the scheduling cell. Search space occasions for PDCCH monitoring for the scheduled cell can be determined by the search space set configuration of the scheduling cell, number of PDCCH candidates for each aggregation level for the scheduled cell are determined by the search space set configuration of the scheduled cell. Additionally, or alternatively, network (e.g., 130) may generate one or more CORESETs for PDCCH transmission.

During operation of system 300, UE 115 may monitor PDCCH for first base station 105 (e.g., first cell). To illustrate, UE 115 may monitor one or more first PDCCH message(s) 360 from first base station 105. The one or more first PDCCH message(s) 360 may be generated by message generator 342 and transmitted via transmitter 334. Additionally, or alternatively, UE 115 may monitor PDCCH for first base station 105 in another cell (other than the first cell). To illustrate, UE may monitor one or more second PDCCH message(s) 361 from second base station 305 (e.g., second cell).

In other implementations, UE 115 receives one or more search space sets for second base station 305 (e.g., a second cell). The one or more search space sets may be saved in memory as SS information 311. UE 115 may perform, based on the one or more search space sets, first PDCCH monitoring for the second cell in a first cell (e.g., the first base station 105) and second PDCCH monitoring for the second cell in the second cell. For example, UE 115 may use PDCCH monitor 323 to perform the first PDCCH monitoring to receive first PDCCH message 360, and may Use PDCCH monitor 323 to perform the second PDCCH monitoring to receive second PDCCH message 361.

In some implementations, one or more rules for the network (e.g., 130) to configure search space sets and CORESETs for monitoring PDCCH of a cell in two cells are described herein. Such rules may define or indicate how to determine the search space set for a cell for monitoring its PDCCH in itself and the search space set for monitoring its PDCCH in another cell. Additionally, or alternatively, such rules may define or indicate how to determine the CORE-SET associated with the search space set.

In some implementations, network (e.g., 130) configures search space set(s) in the second cell (e.g., 305) whose PDCCH can be monitored in itself (the second cell) and in another cell (the first cell). In a first case, for a search space set (SS set B) with ID n in the search space set(s) configured in the second cell, if there is a search space set (SS set A) with same ID n configured in the first cell, UE 115 is configured to monitor PDCCH configured by the search space set (SS set B) in the first cell. It is noted that n is a positive integer. In a second case, for a search space set (SS set B) with ID n in the search space set(s) configured in the second cell, if there is no search space set with same ID n configured in the first cell, UE 115 is configured to monitor PDCCH configured by the search space set (SS set B) in the second cell.

Figure 4:
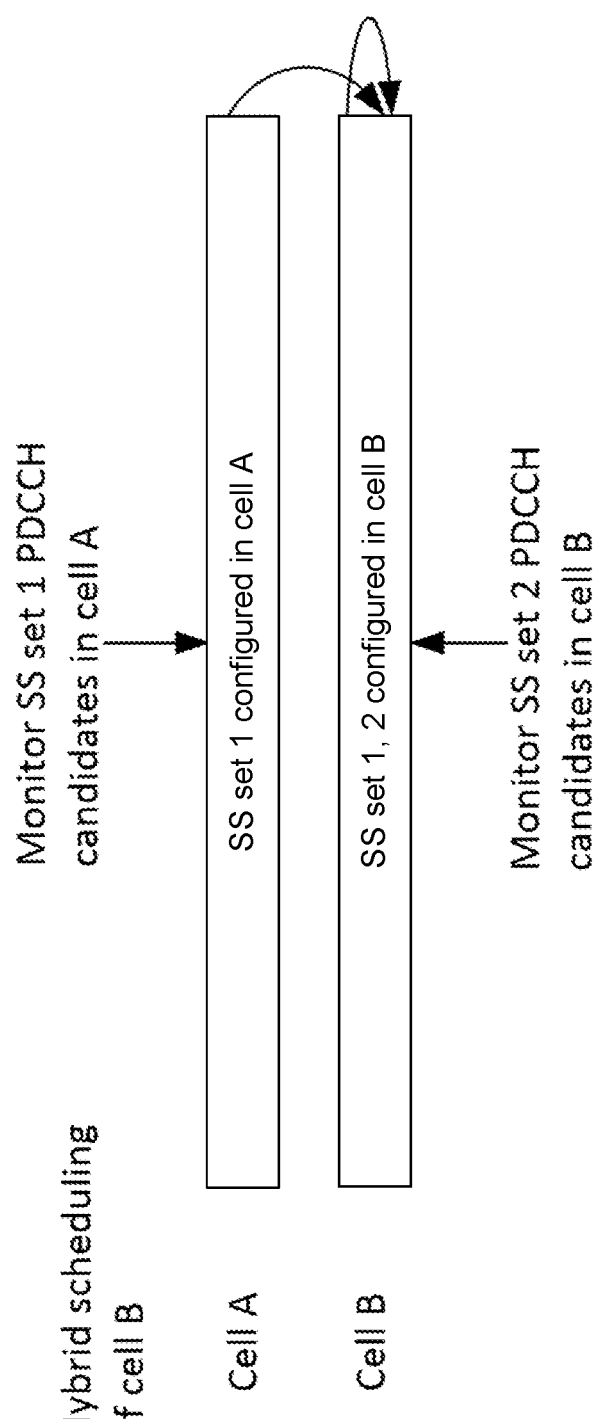
FIG. 4 is diagram illustrating an example to illustrate monitoring PDCCH of one cell in multiple cells in accordance with some aspects of the present disclosure.

Referring to FIG. 4, a diagram illustrating an example to illustrate monitoring PDCCH of one cell in multiple cells is shown. As shown in FIG. 4, cell A may correspond to first cell (of base station 105) and cell B may correspond to second cell (of base station 305). In the example of FIG. 4, SS set ID 1 is configured in both cell A and cell B. UE 115 may monitor PDCCH configured by SS set 1 of cell B in cell A. Additionally, SS set ID 2 is only configured in cell B and UE 115 may monitor PDCCH configured by SS set 2 of cell B in cell B.

In some implementations, the control resource set (CORESET) used for PDCCH monitoring for the first case and the second case (described above) may be determined. To illustrate, for the first case, the CORESET associated with the SS set (SS set B) configured in the second cell may not be used to determine the resource for PDCCH monitoring in the first cell. The resource for PDCCH monitoring may be determined by the CORESET in the first cell associated with the SS set configured with the same ID (SS set A) in first cell. For the second case, the CORESET associated with SS set (SS set B) configured in the second cell may be used to determine the resource for PDCCH monitoring in the second cell. It is noted that the first case and/or the second case, the resource include frequency bandwidth and time domain duration of consecutive symbols for PDCCH monitoring occasions. It is also noted that a CORESET may be associated with the SS set if CORESET ID (ControlResourceSetId) is included in the SS set configuration (SearchSpace).

In some implementations, the network (e.g., 130) may further indicate to UE 115 the set of SS sets that is configured in the second cell for monitoring PDCCH of the second cell. The other SS sets configured in cell B may be ignored.

In some implementations, the network (e.g., 130) may further indicate to UE 115 the set of SS sets that is configured in the first cell for the first case PDCCH monitoring for the second cell.

Figure 5:
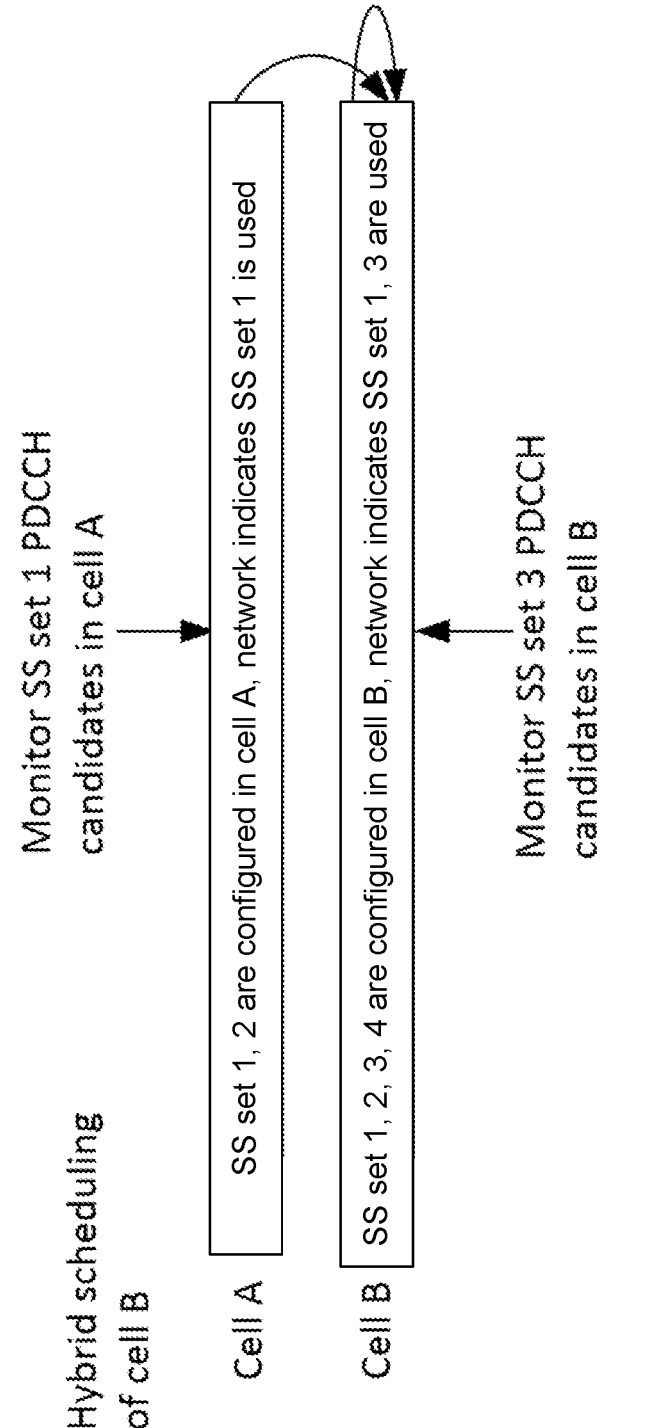
FIG. 5 is diagram illustrating another example to illustrate monitoring PDCCH of one cell in multiple cells in accordance with some aspects of the present disclosure.

Referring to FIG. 5, a diagram illustrating another example to illustrate monitoring PDCCH of one cell in multiple cells is shown. As shown in FIG. 5, cell A may correspond to first cell (of base station 105) and cell B may correspond to second cell (of base station 305). In the example of FIG. 5, SS set IDs 1 and 2 are configured in cell A and the network (e.g., 130) indicates that SS set 1 is used. Additionally, SS set IDs 1, 2, 3, 4 are configured in cell B and the network (e.g., 130) indicates that SS set 1 and 3 are used. UE 115 may monitor PDCCH configured by SS set 1 candidates in cell A because both cell A and cell B have SS set 1. Additionally, UE monitors SS set 3 PDCCH candidates in cell B because the network indicated SS set 3 is used (in addition to SS set 1 which is monitored in cell A). UE 115 may ignore SS sets 2 and 4 as the network did not indicate those sets for monitoring PDCCH of cell B.

In some implementations, a SS set (SS set B) configured in the second cell is: Option A—a SS set configured in the active BWP of the second cell, or Option B—a SS set configured in any BWP (e.g., a non active BWP) of the second cell. It is noted that the first case and the second case (described above) can have different options. For example, the first case can have Option A or Option B, and the second case may only have Option A.

In some implementations, a SS set (SS set A) configured in the first cell should be: Option C—a SS set configured in the active BWP of the first cell, or Option D—a SS set configured in any BWP (e.g., a non-active BWP) of the first cell. It is noted that the first case and the second case may have different options (between Option C and Option D). To illustrate, in the first cell, PDCCH may be monitored only in active BWP by choosing Option C for the first case.

Figure 6:
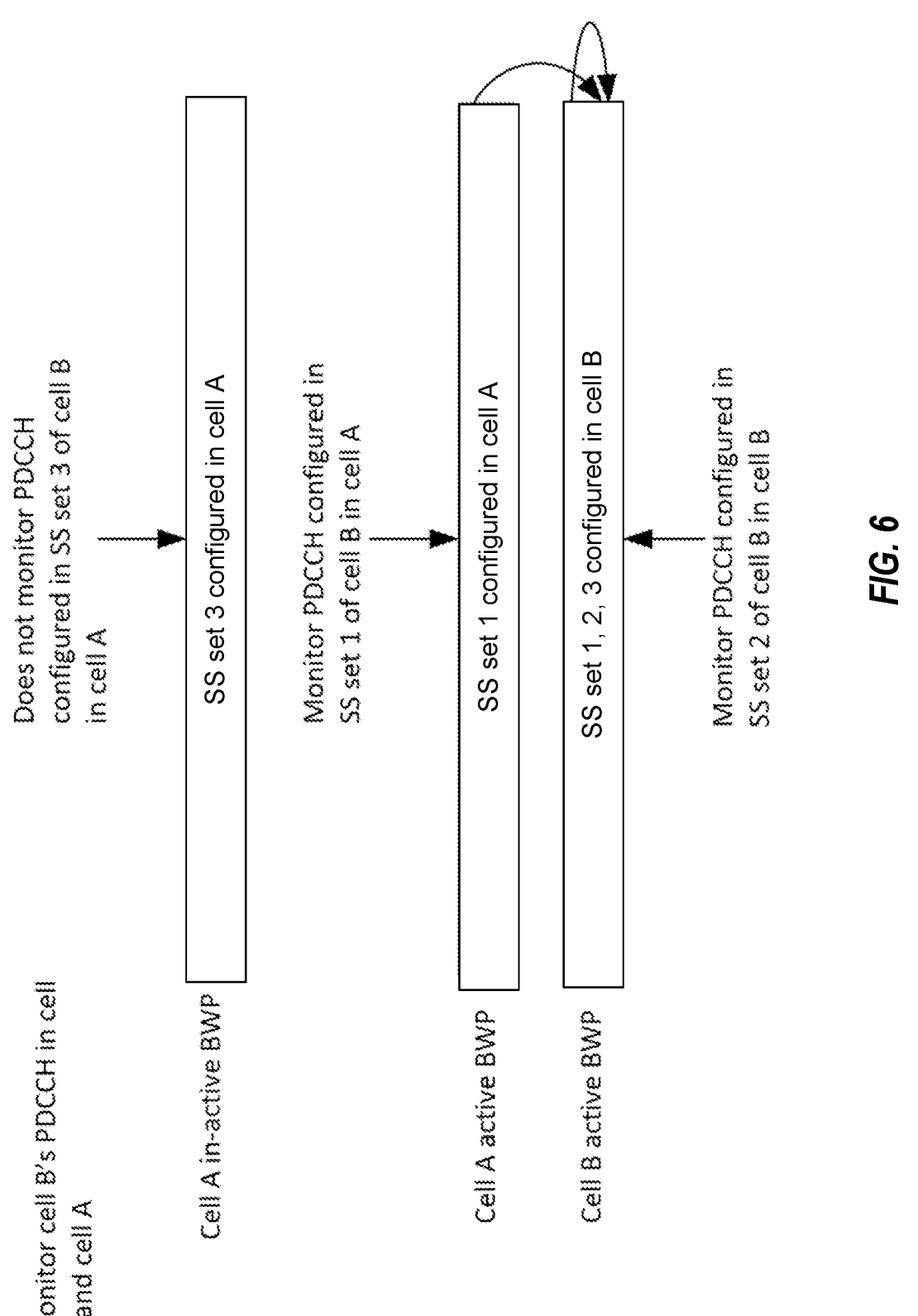
FIG. 6 is diagram illustrating another example to illustrate monitoring PDCCH of one cell in multiple cells in accordance with some aspects of the present disclosure.

Referring to FIG. 6, a diagram illustrating another example to illustrate monitoring PDCCH of one cell in multiple cells is shown. As shown in FIG. 6, cell A may correspond to first cell (of base station 105) and cell B may correspond to second cell (of base station 305). In the example of FIG. 6, cell B has Option A for the first case and the second case, and cell A has Option C for the first case and option D for the second case. Cell A has SS set 3 configured in cell A for in-active BWP and has SS set 1 configured in cell A for active BWP. Cell B has SS sets 1, 2, 3 configured in cell B for active BWP. UE 115 does not monitor PDCCH configured in SS set 3 of cell B in cell A. To illustrate, SS set 3 is in cell A and cell B and, corresponding to the first case, should be in cell A. However, because cell A takes Option C for the first case, UE 115 does not monitor SS set 3 of cell B in cell A because SS set 3 is not in the active BWP as required by Option C. UE 115 monitors PDCCH configured in SS set 1 of cell B in cell A because SS set 1 is in both cell A and cell B, and is in the active BWP of cell A. UE 115 monitors PDCCH configured in SS set 2 of cell B in cell B per the second case because SS set 2 is not in in both cell A and cell B, and per Option A because SS set 2 is in the active BWP of cell B.

Figure 7:
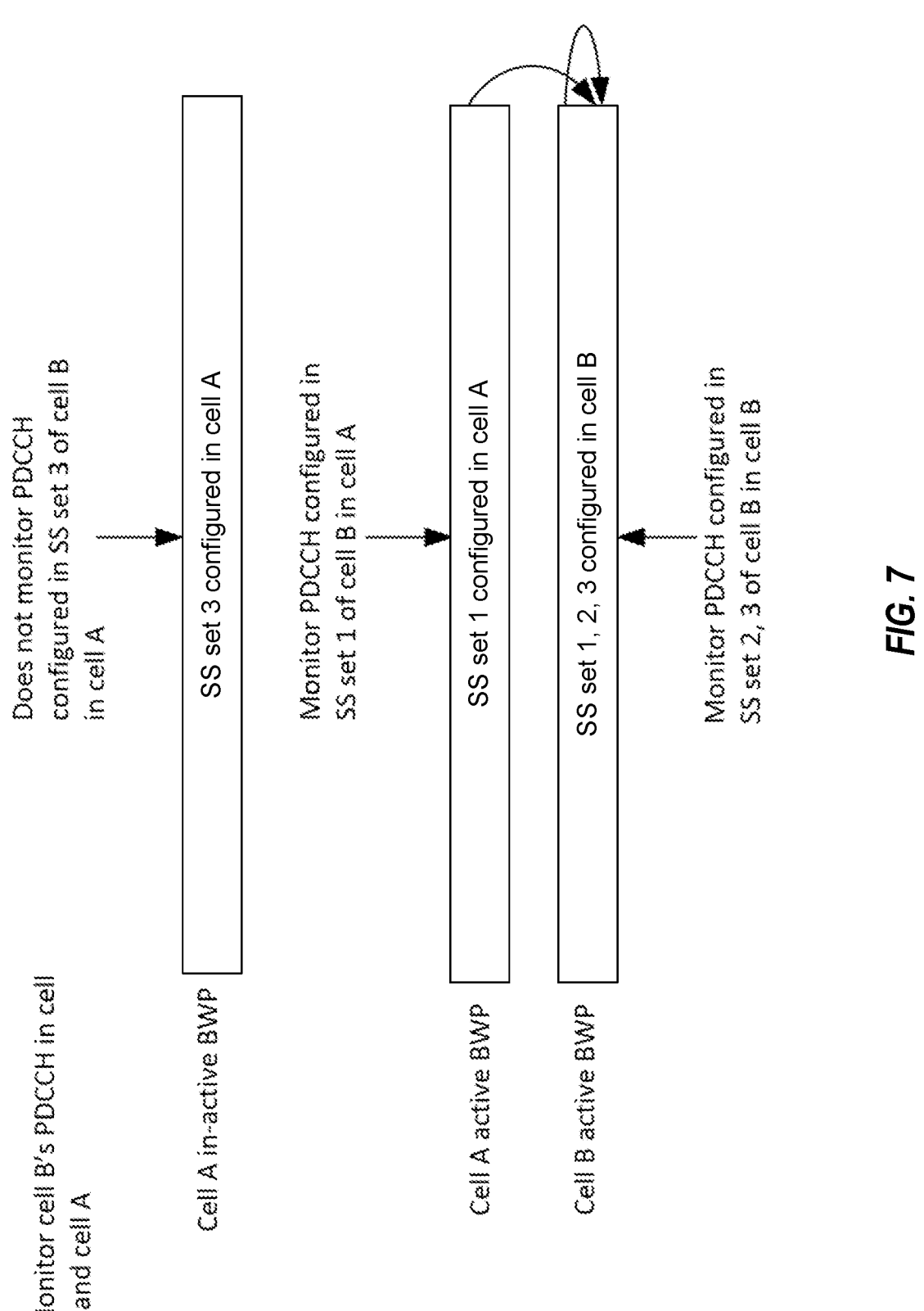
FIG. 7 is diagram illustrating another example to illustrate monitoring PDCCH of one cell in multiple cells in accordance with some aspects of the present disclosure.

Referring to FIG. 7, a diagram illustrating another example to illustrate monitoring PDCCH of one cell in multiple cells is shown. As shown in FIG. 7, cell A may correspond to first cell (of base station 105) and cell B may correspond to second cell (of base station 305). In the example of FIG. 7, cell B has Option A for the first case and the second case, and cell A has Option C for the first case and the second case. Cell A has SS set 3 configured in cell A for in active BWP and has SS set 1 configured in cell A for active BWP. Cell B has SS sets 1, 2, 3 configured in cell B for active BWP. UE 115 does not monitor PDCCH configured in SS set 3 of cell B in cell A. To illustrate, SS set 3 is in cell A and cell B and, corresponding to the first case, should be in cell A. However, because cell A takes Option C for the first case, UE 115 does not monitor SS set 3 of cell B in cell A because SS set 3 is not in the active BWP as required by Option C. UE 115 monitors PDCCH configured in SS set 1 of cell B in cell A because SS set 1 is in both cell A and cell B, and is in the active BWP of cell A. UE 115 monitors PDCCH configured in SS set 2 of cell B in cell B per the second case because SS set 2 is not in both cell A and cell B, and per Option A because SS set 2 is in the active BWP of cell B. UE 115 monitors PDCCH configured in SS set 3 of cell B in cell B because UE considers the active BWP for cell A and cell B for the first and second cases. When considering the first and second cases for SS set 3, SS set 3 is not in both active BWP cells and therefore UE 115 monitors PDCCH configured in SS set 3 of cell B in cell B.

Figure 8:
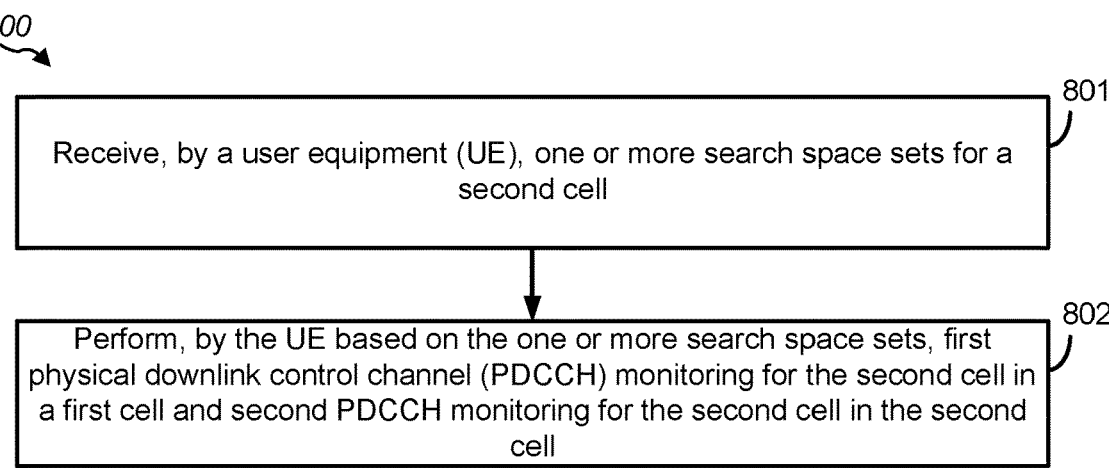
FIG. 8 is a flow diagram illustrating example blocks executed by a UE according to some aspects of the present disclosure.
Figure 9:
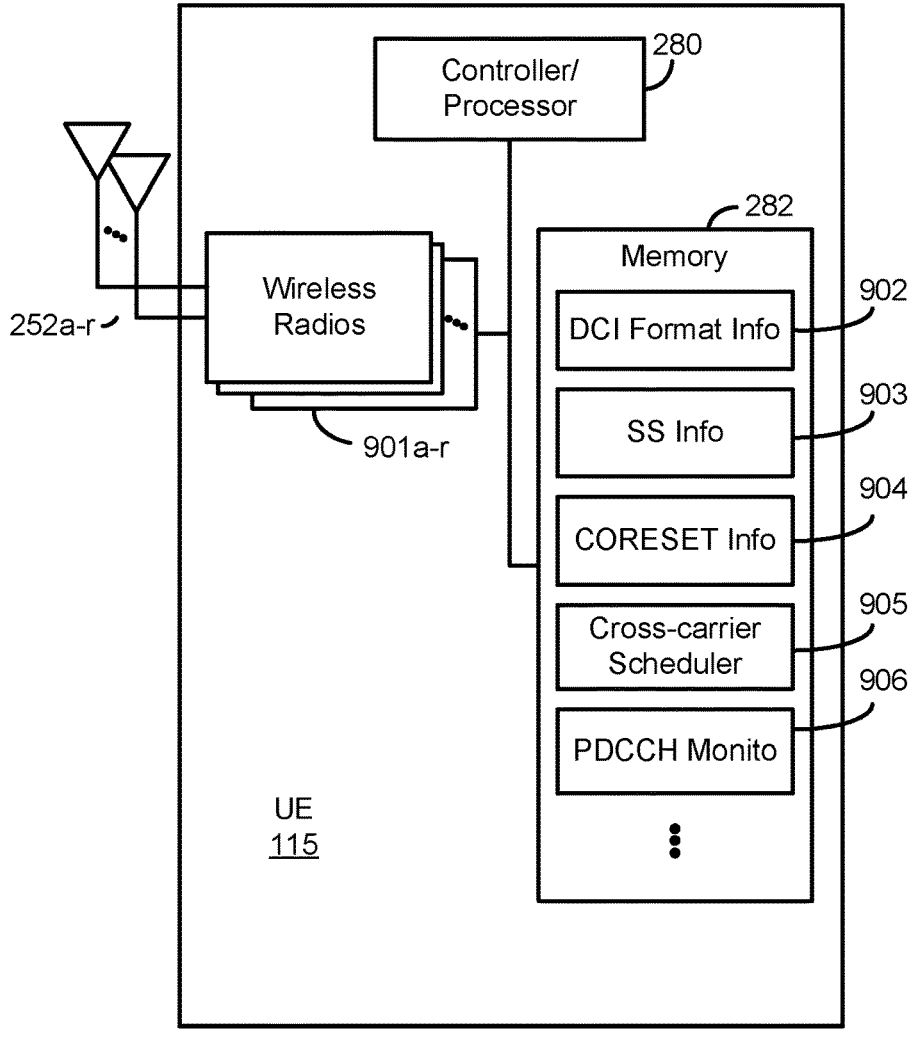
FIG. 9 is a block diagram conceptually illustrating an example design of a UE according to some aspects of the present disclosure.

FIG. 8 is flow diagrams illustrating example methods performed by a UE for communication. For example, the example blocks may cause UE to perform PDCCH monitoring according to some aspects of present disclosure. The example blocks will also be described with respect to UE 115 as illustrated in FIG. 9. FIG. 9 is a block diagram conceptually illustrating an example design of a UE configured to perform PDCCH monitoring according to at least one aspect of the present disclosure. UE 115 includes the structure, hardware, and components as illustrated for UE 115 of FIG. 2 or 3, For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 501*a-r* and antennas 252*a-r*. Wireless radios 901*a-r* includes various components and hardware, as illustrated in FIG. 2 for UE 115, including modulator/demodulator 254*a-r*, MIMO detector 256, receive processor 258, transmit processor 264, and TX MIMO processor 266.

As shown, memory 282 may include DCI format information 902, SS information 903, CORESET information 904, a cross-carrier scheduler 905, and a PDCCH monitor 906. The DCI format information 902, SS information 903, and CORESET information 904 may include or correspond to DCI format information 310, SS information 311, and CORESET information 312, respectively. Cross-carrier scheduler 905 and PDCCH monitor 906 may include or correspond to cross-carrier scheduler 322 and PDCCH monitor 323, respectively. In some aspects, cross-carrier scheduler 905, PDCCH monitor 906, or a combination thereof, may include or correspond to processor(s) 302. UE 115 may receive signals from and/or transmit signal to a base station, such as base station 105, 305 or base station 105 as illustrated in FIG. 6 or to core network 130 of FIG. 3.

Referring to FIG. 8, a sample flow diagram of a method 800 of UE operations for communication is shown. As illustrated at block 801, a UE receives one or more search space sets for a second cell. The second cell may include or correspond to base station 105 or base station 305. In some implementations, the second cell is a secondary cell (SCell). In other implementations, the second cell is a primary cell (PCell). PDCCHs of the second cell are allowed to be monitored in multiple cells. In some implementations, UE 115 may receive the one or more search space sets using wireless radios 901*a-r* and antennas 252*a-r*.

At block 802, the UE performs, based on the one or more search space sets, first physical downlink control channel (PDCCH) monitoring for the second cell in a first cell and second PDCCH monitoring for the second cell in the second cell. In some implementations, UE 115 may receive (or monitor for), from base station 105, 305, one or more PDCCH messages using wireless radios 901*a-r* and antennas 252*a-r*. Monitoring PDCCH for the second cell in multiple cells allows flexible control resource utilization for carrier aggregation (CA). Additionally, or alternatively, the first PDCCH monitoring for the second cell in the first cell and the second PDCCH monitoring for the second cell in the second cell offloads control signaling of the second cell.

In some implementations, when cross-carrier scheduling is configured for the second cell, second cell data is self-schedulable by one or more fallback DCIs having DCI formats (0-0,1-0), and second cell data is cross-carrier schedulable by one or more non-fallback DCIs having DCI formats (0-1, 1-11) in another cell. In other implementations, when cross-carrier scheduling is configured for the second cell; second cell data is cross-carrier schedulable by one or more non-fallback DCIs having DCI formats (0-1, 1-1) in another cell, and at least one other DCI is received in the second cell, the at least one other DCI comprising a group common (GC) DCI, a DCI for broadcast data scheduling, or both.

In some implementations, method 800 further includes receiving, at the UE in the first cell, a first PDCCH for the second cell. Additionally, or alternatively, method 800 may also include receiving, by the UE in the second cell, a second PDCCH for the second cell.

In some implementations, a network configures the one or more search space sets for the second cell. For example, the network may include or correspond to core network 130. Additionally, or alternatively, the network may configure one or more control resource sets (CORESETs) for monitoring PDCCH of the second cell in multiple cells. In some such implementations, method 800 may include receiving, by the UE, the one or more CORSETS, where the one or more CORSETS is associated with the one or more search space sets.

In some implementations, method 800 includes determining, at the UE, whether a first search space set configured in first cell has the same ID as a second search space set configured in the second cell. Method 800 may also include monitoring, by the UE, PDCCH configured by the second search space set in the first cell based on a determination that the first search space set has the same ID as the second search space set. In some implementations, method 800 further includes determining, at the UE, a resource for the fist PDCCH monitoring in the first cell based on a CORE-SET in the first cell associated with the first search space set. In some such implementations, the CORESET associated with the second search space set is not used to determine the resource for the first PDCCH monitoring.

In some implementations, method 800 includes determining, at the UE, whether a first search space set configured in first cell has the same ID as a second search space set configured in the second cell. Method 800 may also include monitoring, by the UE, PDCCH configured by the second search space set in the second cell based on a determination that the first search space set does not have the same ID as the second search space set. In some such implementations, the UE determines a resource for the second PDCCH monitoring in the second cell based on a CORESET in the second cell associated with the second search space set. Additionally, or alternatively, method 800 may include receiving, by the UE from the network, an indication of at least one set of the one or more search space sets for monitoring PDCCH of the second cell. The UE may ignore sets of the one or more sets other than the at least one set. Additionally, or alternatively, method 800 may include receiving, by the UE from the network, an indication of at least one set of the one or more search space sets for monitoring PDCCH of the second cell.

in some implementations, method 800 includes receiving, by the UE from the network, an indication of at least one search space set configured for the first cell for PDCCH monitoring for the second cell. In some such implementations, a set of the one or more search space sets configured in the second cell is configured in an active bandwidth parts (BWP) of the second cell or is configured in any BWP of the second cell. In other implementations, a search space configured in the first cell is configured in an active bandwidth parts (BWP) of the first cell. In some such implementations, a set of the one or more search space sets configured in the second cell is configured in an active bandwidth parts (BWP) of the second cell. Additionally, or alternatively, a search space configured in the fist cell is configured in any BWP of the first cell. In some implementations, a search space configured in the first cell is configured in an active bandwidth parts (BWP) of the first cell or is configured in any BWP of the first cell.

It is noted that one or more blocks (or operations) described with reference to FIG. 8 may be combined with one or mote blocks (or operations) of another of figure. For example, one or more blocks of FIG. 8 may be combined with one or more blocks (or operations) of another of FIG. 2 or 3. Additionally, or alternatively, one or more operations, described above with reference to FIGS. 1-3 may be combine with one or more operations described with reference to FIG. 10.

Figure 10:
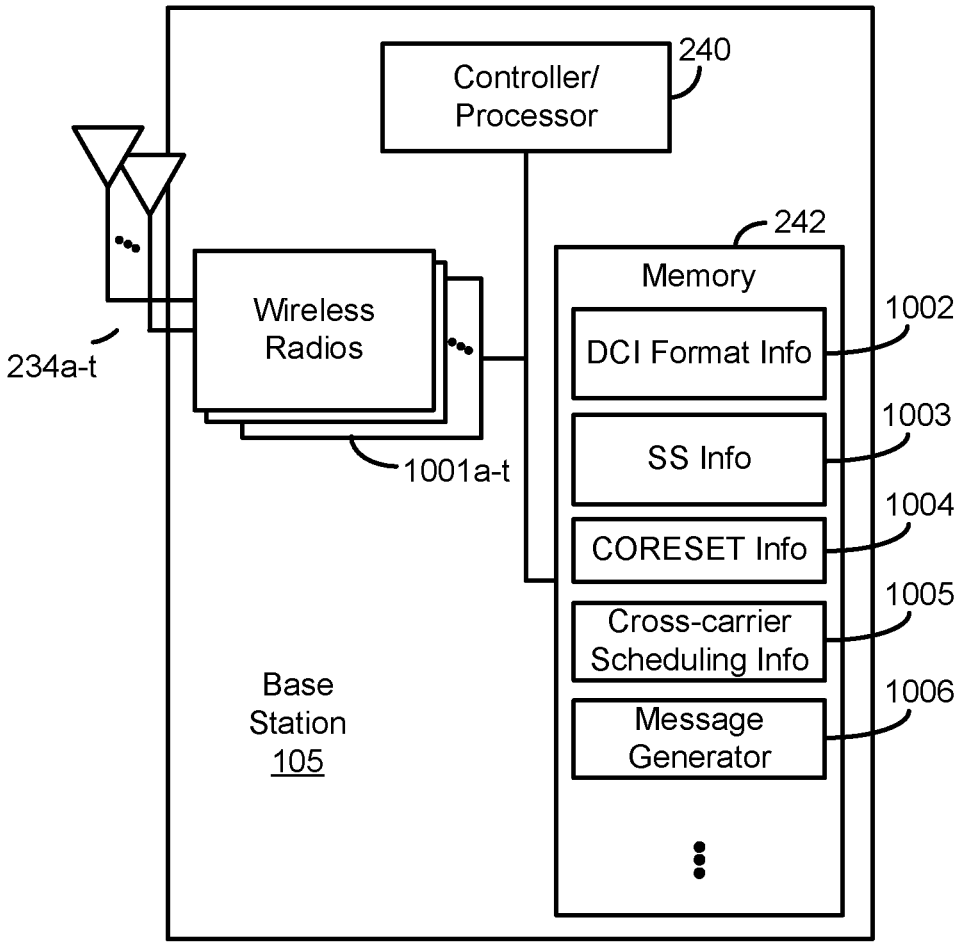
FIG. 10 is a block diagram conceptually illustrating an example design of a base station according to some aspects of the present disclosure.

FIG. 10 is a block diagram conceptually illustrating an example design of a base station 105 configured to configure UE 115 to transmit PDCCH message according to one or more aspects of the present disclosure. FIG. 10 may include or correspond to base station(s) 105, 305 of FIG. 3.

Base station 105 includes the structure, hardware, and components as illustrated for base station 105 of FIG. 2 or 3. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1001*a-t*, and antennas 234*a-t*. Wireless radios 1001*a-t* includes various components and hardware, as illustrated in FIG. 2 for base station 105, including modulator/demodulators 232*a-t*, transmit processor 220, TX MIMO processor 230, MIMO detector 236, and receive processor 238.

As shown, memory 242 may include DCI format information 1002, SS information 1003, CORESET information 1004, cross-carrier scheduling information 605, and a message generator 1006. DCI format information 1002, SS information 1003, CORESET information 1004, and cross-carrier scheduling information 605 may include or correspond to DCI format information 310, SS information 311, CORESET information 312, and cross-carrier scheduling information 1005, respectively. Message generator 1006 may include or correspond to message generator 342. In some aspects, message generator 606 may include or correspond to processor(s) 302. Base station 105 may receive signals from and/or transmit signal to a UE, such as UE 115 as illustrated in FIG. 5, or core network 130 of FIG. 3.

It is noted that one or more blocks (or operations) described with reference to FIG. 10 may be combined with one or more blocks (or operations) of another of figure. For example, one or more blocks of FIG. 10 may be combined with one or more blocks (or operations) of another of FIG. 2 or 3. Additionally, or alternatively, one or more operations described above with reference to FIGS. 1-3 may be combine with one or more operations described with reference to FIG. 10.

In some aspects, a user equipment (UE), one or more search space sets for a second cell. For example, the UE may receive the one or more search space sets from a network. Additionally, or alternatively, the UE may receive one or more search space sets for a first cell.

Additionally, or alternatively, in some aspects, the UE performs, based on the one or more search space sets, first physical downlink control channel (PDCCH) monitoring for the second cell in a first cell and/or second PDCCH monitoring for the second cell in the second cell. In some such aspects, UE may receive a first PDCCH during the first monitoring, a second PDCCH during the second monitoring, or both.

Configuration and/or use of the one or more search space sets for the first cell, the one or more search space sets for the second cell, or both may include additional aspects, such as any single aspect or any combination of aspects described below and/or in connection with one or more other processes described elsewhere herein.

In a first aspect, the UE based on the one or more search space sets, first physical downlink control channel (PDCCH) monitoring for the second cell in a first cell and second PDCCH monitoring for the second cell in the second cell.

In a second aspect, alone or in combination with the first aspect, when cross-carrier scheduling is configured for the second cell; second cell data is self-schedulable by one or more fallback DCIs having DCI formats (0-0, 1-0), and/or second cell data is cross-carrier schedulable by one or more non fallback DCIs having DCI formats (0-1, 1-1) in another cell In a third aspect, alone or in combination with the second aspect, wherein the second cell includes a secondary cell (SCell).

In a fourth aspect, alone or in combination with one or more of the first or second aspects, when cross-carrier scheduling is configured for the second cell; second cell data is cross-carrier schedulable by one or more non-fallback DCIs having DCI formats (0-1, 1-1) in another cell, and/or at least one other DCI is received in the second cell, the at least one other DCI comprising a group common (GC) DCI, a DCI for broadcast data scheduling, or both.

In a fifth aspect, alone or in combination with the fourth aspect, the second cell comprises a primary cell (PCell).

In a sixth aspect, alone or in combination with one or more of the first through fifth aspects, monitoring PDCCH for the second cell in multiple cells allows flexible control resource utilization for carrier aggregation (CA).

In a seventh aspect, alone or in combination with one or more of the first through sixth aspect, the first PDCCH monitoring for the second cell in the first cell and the second PDCCH monitoring for the second cell in the second cell offloads control signaling of the second cell.

In an eighth aspect, alone or in combination with one or more of the first through seventh aspects, the UE, in the first cell, receives a first PDCCH for the second cell. Additionally, or alternatively, the UE, in the second cell, receives a second PDCCH for the second cell.

In a ninth aspect, alone or in combination with one or more of the first through eighth aspects, a network configures the one or more search space sets for the second cell.

In a tenth aspect, alone or in combination with one or more of the first through ninth aspects, the network configures one or more control resource sets (CORESETs) for monitoring PDCCH of the second cell in multiple cells.

In an eleventh aspect, alone or in combination with one or more of the first through tenth aspects, the UE receives the one or more CORSETS. The one or more CORSETS may be associated with the one or more search space sets.

In a twelfth aspect, alone or in combination with one or more of the first through eleventh aspects, the UE determines whether a first search space set configured in first cell has the same ID as a second search space set configured in the second cell. Additionally, or alternatively, the UE monitors PDCCH configured by the second search space set in the first cell based on a determination that the first search space set has the same ID as the second search space set.

In a thirteenth aspect, in combination with the twelfth aspect, the UE determines a resource for the first PDCCH monitoring in the first cell based on a CORESET in the first cell associated with the first search space set.

In a fourteenth aspect, alone or in combination with one or more of the eleventh or twelfth aspects, the CORESET associated with the second search space set is not used to determine the resource for the first PDCCH monitoring.

In a fifteenth aspect, alone or in combination with one or more of the first through eleventh aspects, the UE determines whether a first search space set configured in first cell has the same ID as a second search space set configured in the second cell. Additionally, or alternatively, the UE monitors PDCCH configured by the second search space set in the second cell based on a determination that the first search space set does not have the same ID as the second search space set.

In a sixteenth aspect, in combination with the fifteenth aspect, the UE determines a resource for the second PDCCH monitoring in the second cell based on a CORESET in the second cell associated with the second search space set.

In a seventeenth aspect, alone or in combination with one or more of the first through sixteenth aspects, the UE receives, from the network, an indication of at least one set of the one or more search space sets for monitoring PDCCH of the second cell.

In an eighteenth aspect, in combination with the seventeenth aspects, the UE ignores sets of the one or more sets other than the at least one set.

In a nineteenth aspect, alone or in combination with one or more of the first through eighteenth aspects, the UE receives, from the network, an indication of at least one search space set configured for the first cell for PDCCH monitoring for the second cell.

In a twentieth aspect, in combination with the twelfth aspect, a set of the one or more search space sets configured in the second cell is configured in an active bandwidth parts (BWP) of the second cell or is configured in any BWP the second cell.

In a twenty-first aspect, in combination with the twelfth or twentieth aspects, a search space configured in the first cell is configured in an active bandwidth parts (BWP) of the first cell.

In a twenty-second aspect, in combination with the fifteenth aspect, a set of the one or more search space sets configured in the second cell is configured in an active bandwidth parts (BWP) of the second cell.

In a twenty-third aspect, in combination with the fifteenth or twenty-second aspects, a search space configured in the first cell is configured in any BWP of the first cell.

In a twenty -fourth aspect, alone or in combination with one or more of the first through eighteenth aspects, a search space configured in the first cell is configured in an active bandwidth parts (BWP) of the first cell or is configured in my BWP of the first cell.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps (e.g., the blocks in FIG. 8) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scape of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication performed by a user equipment (UE), the method comprising:
   receiving one or more search space sets for a second cell; and
   performing, based on the one or more search space sets, first physical downlink control channel (PDCCH) monitoring for downlink control information (DCI) for the second cell in a first cell and second PDCCH monitoring for DCI for the second cell in the second cell, wherein: when cross-carrier scheduling is configured for the second cell:

second cell data is self-schedulable by one or more fallback DCIs having DCI formats (0-0, 1-0) on a PDCCH of a secondary cell (SCell); and second cell data is cross-carrier schedulable by one or more non-fallback DCIs having DCI formats (0-1, 1-1) on a PDCCH of another cell; and the second cell includes the SCell.

2. The method of claim 1, wherein PDCCHs of the second cell are allowed to be monitored in multiple cells.

3. The method of claim 1, wherein:

when cross-carrier scheduling is configured for the second cell:

at least one other DCI is received in the second cell, the at least one other DCI comprising a group common (GC) DCI, a DCI for broadcast data scheduling, or both; and the second cell includes a primary cell (PCell).

4. The method of claim 1, wherein:

monitoring PDCCH for the second cell in multiple cells allows flexible control resource utilization for carrier aggregation (CA);

the first PDCCH monitoring for the second cell in the first cell and the second PDCCH monitoring for the second cell in the second cell offloads control signaling of the second cell; or a combination thereof.

5. The method claim 1, further comprising:

receiving, at the UE in the first cell, a first PDCCH for the second cell; and receiving, by the UE in the second cell, a second PDCCH for the second cell; and wherein a network configures the one or more search space sets for the second cell.

6. The method of claim 1, further comprising:

receiving one or more control resource sets (CORESETs), configured by a network, for monitoring PDCCH of the second cell in multiple cells; and wherein the one or more CORESETs is associated with the one or more search space sets.

7. The method of claim 1, further comprising:

determining whether a first search space set configured in first cell has the same ID as a second search space set configured in the second cell;

monitoring PDCCH configured by the second search space set in the first cell based on a determination that the first search space set has the same ID as the second search space set; and determining a resource for the first PDCCH monitoring in the first cell based on a CORESET in the first cell associated with the first search space set; and wherein the CORESET associated with the second search space set is not used to determine the resource for the first PDCCH monitoring.

8. The method of claim 1, further comprising:

determining whether a first search space set configured in first cell has the same ID as a second search space set configured in the second cell;

monitoring PDCCH configured by the second search space set in the second cell based on a determination that the first search space set does not have the same ID as the second search space set; and determining a resource for the second PDCCH monitoring in the second cell based on a CORESET in the second cell associated with the second search space set.

9. The method of claim 1, further comprising:

receiving an indication of at least one set of the one or more search space sets for monitoring PDCCH of the second cell; and ignoring sets of the one or more search space sets other than the at least one set.

10. The method of claim 1, further comprising:

receiving an indication of at least one search space set configured for the first cell for PDCCH monitoring for the second cell.

11. An apparatus configured for wireless communication, the apparatus comprising:

means for receiving one or more search space sets for a second cell; and means for performing, based on the one or more search space sets, first physical downlink control channel (PDCCH) monitoring for downlink control information (DCI) for the second cell in a first cell and second PDCCH monitoring for DCI for the second cell in the second cell, wherein: when cross-carrier scheduling is configured for the second cell:

second cell data is self-schedulable by one or more fallback DCIs having DCI formats (0-0, 1-0) on a PDCCH of a secondary cell (SCell); and second cell data is cross-carrier schedulable by one or more non-fallback DCIs having DCI formats (0-1, 1-1) on a PDCCH of another cell; and the second cell includes the SCell.

12. The apparatus of claim 11, further comprising:

means for receiving, in the first cell, a first PDCCH for the second cell; and means for receiving, in the second cell, a second PDCCH for the second cell.

13. The apparatus of claim 11, further comprising:

means for receiving one or more control resource sets (CORESETs) for monitoring PDCCH of the second cell in multiple cells; and wherein the one or more CORESETs is associated with the one or more search space sets.

14. The apparatus of claim 11, further comprising:

means for determining whether a first search space set configured in first cell has the same ID as a second search space set configured in the second cell; and means for monitoring PDCCH configured by the second search space set in the first cell based on a determination that the first search space set has the same ID as the second search space set.

15. The apparatus of claim 11, further comprising:

means for determining whether a first search space set configured in first cell has the same ID as a second search space set configured in the second cell; and means for monitoring PDCCH configured by the second search space set in the second cell based on a determination that the first search space set does not have the same ID as the second search space set.

16. The apparatus of claim 11, further comprising:

means for receiving an indication of at least one set of the one or more search space sets for monitoring PDCCH of the second cell.

17. The apparatus of claim 11, further comprising:

means for receiving an indication of at least one search space set configured for the first cell for PDCCH monitoring for the second cell.

18. A non-transitory computer-readable medium having program code recorded thereon, the program code comprising:

program code executable by a computer for causing the computer to:

receive one or more search space sets for a second cell; and perform, based on the one or more search space sets, first physical downlink control channel (PDCCH) monitoring for downlink control information (DCI) for the second cell in a first cell and second PDCCH monitoring for DCI for the second cell in the second cell, wherein: when cross-carrier scheduling is configured for the second cell:

second cell data is self-schedulable by one or more fallback DCIs having DCI formats (0-0, 1-0) on a PDCCH of a secondary cell (SCell); and second cell data is cross-carrier schedulable by one or more non-fallback DCIs having DCI formats (0-1, 1-1) on a PDCCH of another cell; and the second cell includes the SCell.

19. The non-transitory computer-readable medium of claim 18, wherein the first PDCCH monitoring for the second cell in the first cell and the second PDCCH monitoring for the second cell in the second cell offloads control signaling of the second cell.

20. The non-transitory computer-readable medium of claim 18, wherein the program code is further executable by the computer for causing the computer to:

receive, at a user equipment (UE) in the first cell, a first PDCCH for the second cell; and receive, by the UE in the second cell, a second PDCCH for the second cell.

21. The non-transitory computer-readable medium of claim 18, wherein the program code is further executable by the computer for causing the computer to:

determine whether a first search space set configured in first cell has the same ID as a second search space set configured in the second cell; and monitor PDCCH configured by the second search space set in the first cell based on a determination that the first search space set has the same ID as the second search space set.

22. The non-transitory computer-readable medium of claim 18, wherein the program code is further executable by the computer for causing the computer to:

determine whether a first search space set configured in first cell has the same ID as a second search space set configured in the second cell; and monitor PDCCH configured by the second search space set in the second cell based on a determination that the first search space set does not have the same ID as the second search space set.

23. The non-transitory computer-readable medium of claim 18, wherein the program code is further executable by the computer for causing the computer to:

receive an indication of at least one set of the one or more search space sets for monitoring PDCCH of the second cell.

24. The non-transitory computer-readable medium of claim 18, wherein the program code is further executable by the computer for causing the computer to:

receive an indication of at least one search space set configured for the first cell for PDCCH monitoring for the second cell.

25. A user equipment (UE) configured for wireless communication, the UE comprising:

at least one processor; and a memory coupled to the at least one processor, wherein the at least one processor is configured to:

receive one or more search space sets for a second cell; and perform, based on the one or more search space sets, first physical downlink control channel (PDCCH) monitoring for downlink control information (DCI) for the second cell in a first cell and second PDCCH monitoring for DCI for the second cell in the second cell, wherein: when cross-carrier scheduling is configured for the second cell:

second cell data is self-schedulable by one or more fallback DCIs having DCI formats (0-0, 1-0) on a PDCCH of a secondary cell (SCell); and second cell data is cross-carrier schedulable by one or more non-fallback DCIs having DCI formats (0-1, 1-1) on a PDCCH of another cell; and the second cell includes the SCell.

26. The UE of any of claim 25, wherein:

when cross-carrier scheduling is configured for the second cell at least one other DCI is received in the second cell, the at least one other DCI comprising a group common (GC) DCI, a DCI for broadcast data scheduling, or both.

27. The UE of claim 25, wherein:

monitoring PDCCH for the second cell in multiple cells allows flexible control resource utilization for carrier aggregation (CA);

the first PDCCH monitoring for the second cell in the first cell and the second PDCCH monitoring for the second cell in the second cell offloads control signaling of the second cell; or a combination thereof.

28. The UE of claim 25, wherein the at least one processor is further configured to:

receive, in the first cell, a first PDCCH for the second cell; and receive, in the second cell, a second PDCCH for the second cell; and wherein a network configures the one or more search space sets for the second cell.

29. The UE of claim 25, wherein:

the at least one processor is further configured to:

receiving one or more control resource sets (CORESETs), configured by a network, for monitoring PDCCH of the second cell in multiple cells; and the one or more CORESETs is associated with the one or more search space sets.

30. The UE of claim 25, wherein the at least one processor is further configured to:

determine whether a first search space set configured in first cell has the same ID as a second search space set configured in the second cell;

monitor PDCCH configured by the second search space set in the first cell based on a determination that the first search space set has the same ID as the second search space set; and determine a resource for the first PDCCH monitoring in the first cell based on a CORESET in the first cell associated with the first search space set, the CORESET associated with the second search space set is not used to determine the resource for the first PDCCH monitoring.

31. The UE of claim 25, wherein the at least one processor is further configured to:

determine whether a first search space set configured in first cell has the same ID as a second search space set configured in the second cell;

monitor PDCCH configured by the second search space set in the second cell based on a determination that the first search space set does not have the same ID as the second search space set; and determine a resource for the second PDCCH monitoring in the second cell based on a CORESET in the second cell associated with the second search space set.

32. The UE of claim 25, wherein the at least one processor is further configured to:

receive an indication of at least one set of the one or more search space sets for monitoring PDCCH of the second cell; and ignore sets of the one or more search space sets other than the at least one set.

33. The UE of claim 25, wherein the at least one processor is further configured to:

receive an indication of at least one search space set configured for the first cell for PDCCH monitoring for the second cell.

\*　\*　\*　\*　\*